United States Patent
Park et al.

(10) Patent No.: US 9,015,293 B2
(45) Date of Patent: Apr. 21, 2015

(54) METHOD AND APPARATUS FOR CONFIGURING PING INTERVAL IN A PORTABLE TERMINAL

(75) Inventors: Yong-Seok Park, Yongin-si (KR); Min-Ji Lee, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 13/598,876

(22) Filed: Aug. 30, 2012

(65) Prior Publication Data

US 2013/0060920 A1 Mar. 7, 2013

(30) Foreign Application Priority Data

Sep. 1, 2011 (KR) .................. 10-2011-0088730

(51) Int. Cl.
*G06F 15/177* (2006.01)
*H04W 52/02* (2009.01)
(52) U.S. Cl.
CPC ................. *H04W 52/0209* (2013.01)

(58) Field of Classification Search
USPC .................... 709/220–224, 227–228
See application file for complete search history.

(56) References Cited

U.S. PATENT DOCUMENTS

| 7,133,891 B1* | 11/2006 | Uceda-Sosa et al. ......... 709/203 |
| 2010/0042708 A1* | 2/2010 | Stamler et al. ............... 709/221 |
| 2011/0099279 A1* | 4/2011 | Hooper et al. ............... 709/227 |
| 2011/0116417 A1* | 5/2011 | Chang ............................ 370/255 |
| 2012/0173645 A1* | 7/2012 | Marcellino et al. ........... 709/206 |

* cited by examiner

*Primary Examiner* — Abdullahi Salad
(74) *Attorney, Agent, or Firm* — Jefferson IP Law, LLP

(57) ABSTRACT

An apparatus and a method for setting a ping interval in a portable terminal are provided. The method includes transmitting a ping message to a server after a predefined time period corresponding to a set ping interval and determining whether a response message is received from the server, so as to determine whether a ping test succeeds, determining whether a short interval count value of the set ping interval is 0 by referring to a count table when the ping test is determined to be successful, and resetting the ping interval, and determining whether the short interval count value of the set ping interval is 0 by referring to the count table when the ping test fails, and resetting the ping interval.

14 Claims, 3 Drawing Sheets

COUNT TABLE

| Short Interval Count \ Top Interval Count | 0 | 1 | 2 | 3 | 4 | ... |
|---|---|---|---|---|---|---|
| 0 | 8 | 16 | 24 | 32 | 40 | ... |
| 1 | 10 | 18 | 26 | 34 | 42 | ... |
| 2 | 12 | 20 | 28 | 36 | 44 | ... |
| 3 | 14 | 22 | 30 | 38 | 46 | ... |
| ⋮ | ⋮ | ⋮ | ⋮ | ⋮ | ⋮ | |

FIG.3A

UNIT OF TOP INTERVAL (Top Interval Unit) = 8

UNIT OF SHORT INTERVAL (Short Interval Unit) = 2

Short Interval Limit = $\dfrac{\text{Top Interval Unit}}{\text{Short Interval Unit}} - 1 = 3$

FIG.3B

METHOD AND APPARATUS FOR CONFIGURING PING INTERVAL IN A PORTABLE TERMINAL

PRIORITY

This application claims the benefit under 35 U.S.C. §119(a) of a Korean patent application filed on Sep. 1, 2011 in the Korean Intellectual Property Office and assigned Serial No. 10-2011-0088730, the entire disclosure of which is hereby incorporated by reference.

BACKGROUND OF THE INVENTION

1. Field of the Invention

The present invention relates to a portable terminal. More particularly, the present invention relates to a method and an apparatus for calculating and determining an optimized ping interval value in a portable terminal so as to minimize battery power consumption of the portable terminal and to minimize a load on a network of a server.

2. Description of the Related Art

As a portable terminal has been advanced to a form of a smart phone, the portable terminal has provided many useful functions through applications that provide varied functions and thus, the use of the portable terminal has been popularized.

The portable terminal may provide data communication to a user through connection with a server of a communication network, in addition to voice communication. The portable terminal may perform a ping test that transmits a ping message to the server and determines whether a response message is received from the server, so as to maintain the connection with the server.

The ping test may be performed at regular time intervals (i.e., ping intervals).

When the ping test is performed during a short ping interval, a reliable connection between the portable terminal and the server may be secured. However, battery power consumption may increase in the portable terminal, and load on a network may increase in the server. Conversely, when the ping test is performed during a relatively long interval, the battery power consumption of the portable terminal and the load of the server may decrease. However, there is a drawback in that the reliable connection between the portable terminal and the server is not secured.

Therefore, it is important to determine an optimized ping interval value that minimizes the battery power consumption of the portable terminal and the load on the server network, and simultaneously, secures the reliable connection between the portable terminal and the server.

A technology of the related art for determining an optimized ping interval value may perform the ping test based on a predefined fixed ping interval value or may perform the ping test based on an average value of ping interval values during a predefined period of time, according to whether ping tests succeed after performing ping tests based on various ping interval values.

However, the method of performing the ping test based on a processed ping interval value may have difficulty in effectively minimizing the power consumption of the portable terminal and the load on the network of the server. In addition, the method of performing the ping test based on an average value of the ping interval values during a predefined time may have difficulty in securing the reliable connection between the portable terminal and the server.

Therefore, a need exists for a method that minimizes the power consumption of the portable terminal and the load on the network of the server, and simultaneously, secures the reliable connection between the portable terminal and the server.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for performing a ping test by calculating an optimized ping interval value so that power consumption of a portable terminal and a load on a network of a server may be minimized.

In accordance with an aspect of the present invention, a method for setting a ping interval in a portable terminal is provided. The method includes transmitting a ping message to a server after a predefined time period corresponding to a set ping interval and determining whether a response message is received from the server, so as to determine whether a ping test succeeds, determining whether a short interval count value of the set ping interval is 0 by referring to a count table when the ping test is determined to be successful and resetting the ping interval, and determining whether the short interval count value of the set ping interval is 0 by referring to the count table when the ping test fails and resetting the ping interval.

In accordance with another aspect of the present invention, an apparatus for setting a ping interval in a portable terminal is provided. The apparatus includes a memory for storing a count table formed of ping interval values corresponding to top interval count values and short interval count values, a wireless transceiving unit for providing a communication function with a server, and a controller for transmitting a ping message to a server after a predefined time period corresponding to a set ping interval and for determining whether a response message is received from the server, so as to determine whether a ping test succeeds, for determining whether a short interval count value of the set ping interval is 0 by referring to a count table when the ping test succeeds and resetting of the ping interval, and for determining whether the short interval count value of the set ping interval is 0 by referring to the count table when the ping test fails and resetting of the ping interval.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description when taken in conjunction with the accompanying drawings in which:

FIG. 3A is a diagram illustrating a count table used for calculating an optimized ping interval value according to an exemplary embodiment of the present invention; and FIG. 3B is a diagram illustrating a unit value of a top interval, a unit value of a short interval, and a maximum value of the short interval according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
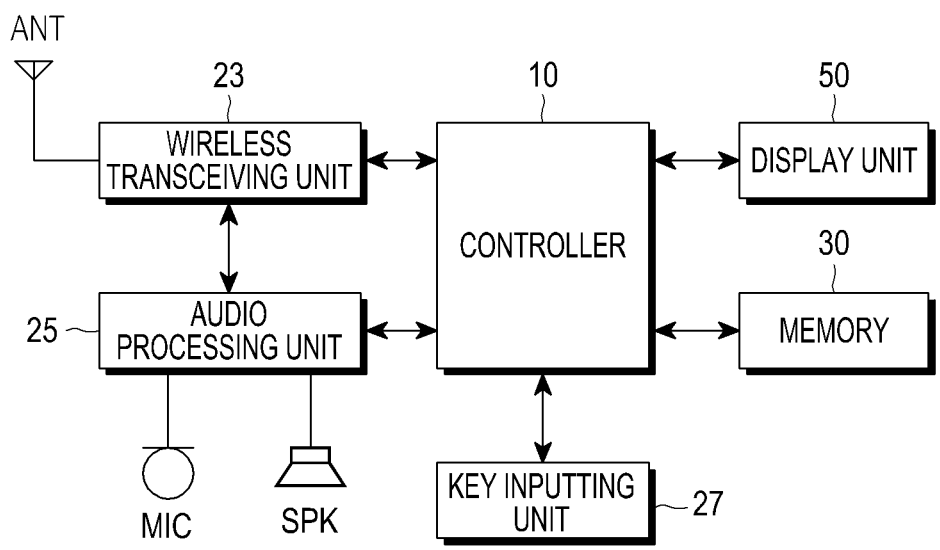
FIG. 1 is a block diagram illustrating a portable terminal according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A portable terminal of exemplary embodiments of the present invention may be a video telephone, a portable phone, a smart phone, an International Mobile Telecommunication-2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic Book (E-Book) reader, a digital camera, a Portable Computer (PC), such as a notebook, a tablet, and the like. The portable terminal according to an exemplary embodiment of the present invention will be described with reference to FIG. 1.

FIGS. 1 through 3B, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a portable terminal according to an exemplary embodiment of the present invention.

Referring to FIG. 1, a portable terminal may include a wireless transceiving unit 23, an audio processing unit 25, a controller 10, a key inputting unit 27, a display unit 50, a memory 30, a microphone (MIC), and a speaker (SPK). The wireless transceiving unit 23 may include a Radio Frequency (RF) unit and a modem. The RF unit may include an RF transmitter for up-converting and for amplifying a frequency of a transmitted signal, an RF receiver for low-noise amplifying a received signal and for down-converting a frequency, and the like. The modem may include a transmitter for encoding and modulating a signal to be transmitted, a receiver for decoding and demodulating a signal received from the RF unit, and the like.

The portable terminal may perform a ping test, by transmitting a ping message to a server (not illustrated), and receiving a response message from the server that receives the ping message, for example, a WCDMA communication server, through use of the wireless transceiving unit 23.

The audio processing unit 25 may form a codec, and the codec may include a data codec and an audio codec. The data codec may process packet data and the like, and the audio codec may process an audio signal, such as a voice file, multimedia file, and the like. The audio processing unit 25 may convert a digital audio signal received from the modem into an analog signal through use of the audio codec so as to play back the signal, or may convert an analog audio signal generated from a microphone into a digital audio signal through use of the audio codec so as to transmit the signal to the modem. The codec may be separately included or may be included in the controller 210.

The portable terminal may inform a user of a result of the ping test in a form of acoustic information (for example, informing through a speaker) when it is needed or requested, through use of the audio processing unit 25.

The key inputting unit 27 may include keys required for inputting number and character information, function keys required for setting various functions, a touch pad, and the like. When the display unit 50 is embodied to be a touch screen type, such as a capacitive touch screen, a resistive touch screen, or the like, the key input unit 27 may include predefined keys at the minimum, and the display unit 50 may be substituted for a part of a key input function of the key input unit 27.

The user may manually input a ping interval value corresponding to an interval for operating a ping test, by inputting a key, through use of the key inputting unit 27.

The memory 30 may include a program memory and a data memory. Here, the program memory may store a program for controlling a general operation of the portable terminal. The memory 30 may further include an external memory, such as a Compact Flash (CF) memory, a Secure Digital (SD) memory, a Micro Secure Digital (Micro-SD) memory, a Mini Secure Digital (Mini-SD) memory, an extreme Digital (xD) memory, a memory stick, and the like. In addition, the memory may include a disk, such as a Hard Disk Drive (HDD), a Solid State Disk (SSD), and the like.

The memory 30 may store a count table associated with a top interval count and a short interval count to be described with reference to FIG. 3A, and may store a ping interval value associated with a top interval count value and a short interval count value.

In addition, the memory 30 may store a value of a currently set ping interval, and when the current ping interval value is updated, the memory 30 may store the updated ping interval value.

The display unit 50 may be formed of a Liquid Crystal Display (LCD), an Organic Light Emitting Diode (OLED), such as a Passive Matrix OLED (PMOLED) or an Active Matrix OLED (AMOLED), or the like, and may output various display information generated in the portable terminal. The display unit 50 may include a touch screen, for example, a capacitive touch screen, a resistive touch screen, or the like, and may operate as an inputting unit that controls the portable terminal, together with the key inputting unit 27.

The display unit 50 may display the count table stored in the memory 30, when it is needed or requested.

The controller 10 may control a general operation of the portable terminal, and may convert and control an operation of the portable terminal based on a user's input inputted through the key inputting unit 27, the display unit 50, or the like. The controller 10 may transmit a ping message to a server after a predefined time period corresponding to the set ping interval, and may determine whether a response message is received from the server so as to determine whether a ping test succeeds. When the ping test succeeds, the controller 10 may determine whether a short interval count value of the set ping interval is 0 by determining the count table, and reset the ping interval. When the ping test fails, the controller 10 may determine whether the short interval count value of the set ping interval is 0 by determining the count table, and reset the ping interval. Operations of the controller 10 will be described with reference to FIG. 2.

Although devices that may be included in the portable terminal, such as a Bluetooth module, a camera module, a Wi-Fi module, an acceleration sensor, a geomagnetic sensor, a Digital Media Broadcasting (DMB) receiver, and the like, are not illustrated, it is apparent to those skilled in the art that the devices may be included in the portable terminal and may provide corresponding functions.

Figure 2:
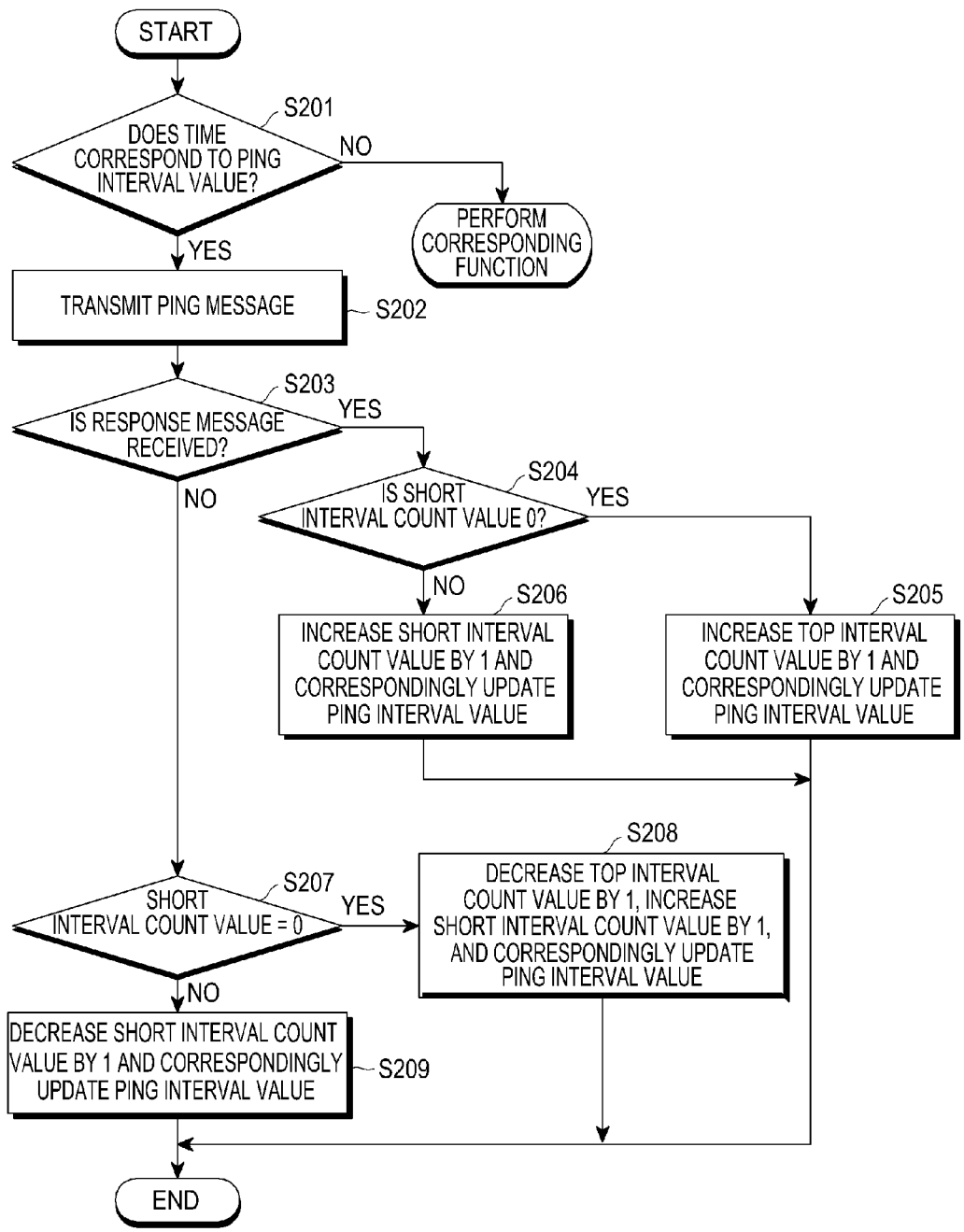
FIG. 2 is a flowchart illustrating a process of calculating an optimized ping interval value according to an exemplary embodiment of the present invention.

FIG. 2 illustrates a process of calculating an optimized ping interval value. FIG. 3A illustrates a count table used for calculating an optimized ping interval value. FIG. 3B illustrates a unit value of a top interval, a unit value of a short interval, and a maximum value of the short interval. Exemplary methods for performing a ping test by calculating an optimized ping interval value will be described with reference to FIGS. 1 through 3B.

Referring to FIGS. 1 through 3B, in steps S201 through S203, the controller 10 may determine a currently set ping interval value, may transmit a ping message to a server after a predefined time period corresponding to the ping interval, and may determine whether a response message is received from the server, after transmitting the ping message to the server.

The portable terminal may perform a ping test that transmits a ping message to a server and receives a response message from the server, at predefined time intervals, and the predefined time interval during which the ping test is performed may be referred to as a ping interval.

Therefore, the controller 10 may determine whether the ping test succeeds after the time corresponding to the currently set interval value (for example, a predefined time period in minutes), by exchanging the ping message and the response message with the server.

For example, when it is assumed that a ping interval of 14 minutes is required to use a first communication server and a ping interval of 40 minutes is required to use a second communication server, the controller 10 may perform the ping test based on 14 minutes or 40 minutes.

Based on whether the response message is received from the server in step S203, exemplary embodiments of the present invention may determine a short interval count value so as to adjust the short interval count value and a top interval count value, and may determine an optimized ping interval value based on the adjusted short interval count value and the adjusted top interval count value.

Therefore, a top interval count, a short interval count, a unit value of a top interval, a unit value of a short interval, a limited value of the unit value of the short interval in the exemplary embodiments of the present invention will be described with reference to FIGS. 3A and 3B.

Referring to the count table of FIG. 3A, an initial ping interval may have a value of 8 (for example, 8 minutes) which corresponds to when a top interval count value and a short interval count value are 0, respectively. In addition, referring to FIG. 3B, a top interval value has a unit of 8, and a short interval value has a unit of 2. Therefore, a ping interval value may increase or decrease based on the unit of 8 based on the increase or decrease of the top interval count, and may increase or decrease based on the unit of 2 based on the increase or decrease of the short interval count.

For example, when the top interval count value increases based on a unit of 1 (proceeding in the horizontal direction) in the count table of FIG. 3A, the ping interval value may increase based on a unit of 8, and may be understood to increase based on 8 minutes. In addition, when the short interval count value increases based on a unit of 1 (proceeding in the vertical direction) in the count table of FIG. 3A, the ping interval value may increase based on a unit of 2, and may be understood to increase based on 2 minutes.

In the count table of FIG. 3A, ping interval values corresponding to top interval count values and short interval count values are arranged. For example, a ping interval value of 8 may correspond to when the short interval count value and the top interval count value are 0, respectively. A ping interval value of 46 may correspond to when the short interval count value is 3 and the top interval count value is 4. In this manner, ping interval values of 8, 16, 24, 32, 40, 10, 18, 26, 34, 42, 12, 20, 28, 36, 44, 14, 22, 30, 38, and 46 may have corresponding short interval count values and corresponding top interval count values.

Referring to FIG. 3B, the unit value of the short interval may be limited within a value obtained by dividing the unit value of the top interval by the unit value of the short interval and subtracting 1, so that ping interval values corresponding to the short interval count value and the top interval count value may not overlap each other.

For example, when the unit value of the top interval is 8 and the unit value of the short interval is 4 and the unit value of the short interval is not limited within a predefined range, a ping interval value may be 16 when the short interval count value is 2 and the top interval count value is 0, and also, a ping interval value may be 16 when the short interval count value is 0 and the top interval count value is 1, in the table of FIG. 3A.

Although exemplary embodiments of the present invention have described that the initial ping interval value is 8, a unit of increase or decrease in a ping interval value associated with increase or decrease of the top interval count is 8, and a unit of increase or decrease in a ping interval value associated with increase or decrease of the short interval count is 2, with reference to FIGS. 3A and 3B, the values may vary based on modulation in the exemplary embodiments of the present invention.

In step S204, the controller 10 may determine whether the short interval count value is 0 when the response message is received from the server in step S203.

When it is determined in step 203 that the ping test succeeds, the controller 10 may attempt to increase the ping interval value based on a large unit (for example, a unit of 8 minutes), that is, to increase the top interval count value, so as to minimize power consumption of the portable terminal and load on a network of the server. Under the assumption that communication connection between the portable terminal and the server is maintained, it is more desirable to minimize the power consumption of the portable terminal and the load on the network of the server as the ping interval is longer.

In step S205, when the short interval count value is determined in step 204 to be 0, the controller 10 may increase the top interval count value by 1, and may update the ping interval value to a corresponding ping interval value.

In step S205, the controller 10 may determine a top interval count corresponding to the current ping interval value by referring to the count table stored in the memory 30, to increase the determined top interval count by 1, and to update the current ping interval value to a ping interval value corresponding to the top interval count increased by 1.

For example, referring to FIG. 3A, when the ping test succeeds using a ping interval value of 16, and the short interval count value is determined to be 0, the top interval count may increase from 1 to 2, and the current ping interval value may be updated from 16 to 24. In addition, when the ping test succeeds using a ping interval value of 24, and the short interval count value is determined to be 0, the top interval count may increase from 2 to 3, and the current ping interval value may be updated from 24 to 32. Therefore, when the short interval count value is 0 and the ping test does not fail using a corresponding ping interval value, updating of the ping interval value may continuously proceed in a direction of (a) of FIG. 3A.

In step S206, when the short interval count value is determined in step 204 to be different from 0, the controller 10 may update (or reset) the ping interval value to a ping interval value corresponding to a short interval count value that is increased by 1 from the short interval count value corresponding to the current ping interval value.

When it is determined that the ping test succeeds, and the short interval count value corresponding to the current ping interval value is different from 0 by referring to the count table stored in the memory 30, the controller 10 may determine that a ping test performed by increasing a top interval count value, that is, by increasing the ping interval value based on a unit of 8, has failed.

In this example, therefore, the controller 10 may increase the short interval count value by 1 from the short interval count value corresponding to the current ping interval value, and increase (update) the ping interval value based on a unit of 2 which is smaller than 8. Accordingly, an exemplary embodiment of the present invention may increase the ping interval value, and simultaneously, may prevent failure of the ping test which may occur later on due to the increased ping interval value.

Here, step S206 may correspond to a case in which a ping interval value increases in a direction of (c) of FIG. 3A.

In step S207, the controller 10 may determine whether the short interval count value is 0 even when the response message is not received from the server in step S203.

An exemplary embodiment of the present invention may determine whether the short interval count value corresponding to the current ping interval value is 0 even when the ping test fails, so as to determine a degree by which the current ping interval value of the failed ping test is to be increased or decreased.

In step S208, when the short interval count value corresponding to the current ping interval value is determined to be 0, the controller 10 may update the ping interval value to a ping interval value corresponding to a top interval count value that is decreased by 1 from a top interval count value corresponding to the current ping interval value.

Although the ping test fails using the current ping interval value, when the short interval count value corresponding to the current ping interval value is determined to be 0 by referring to the count table, the current ping interval value may be determined to be a ping interval value that has increased based on a unit of 8 and has been updated.

For example, referring to FIG. 3A, when the ping test fails using a ping interval value of 40, a short interval count corresponding to the ping interval value of 40 may be 0 and thus, the current ping interval value of 40 may be determined to be a ping interval value that is increased (updated) based on a unit of 8 since a ping test using a ping interval value of 32 succeeds.

Therefore, in step S208, the controller 10 may decrease the top interval count value by 1 and may increase the short interval count value by 1 in the direction of (b) as shown in FIG. 3A, and may update the current ping interval value to a corresponding ping interval value. For example, when a ping test using a ping interval value of 40 fails, the current ping interval value of 40 may be updated to a ping interval value of 34.

For example, in step S205, when a ping test fails using a ping interval value, which is updated to 40 (increased by 8) since the ping test using the ping interval value of 32 succeeds fails, the successful ping interval value of 32 may be increased by a value smaller than 8 (that is, by 2). For example, when the ping test fails by increasing a ping interval by 8 minutes, a ping test may be performed through use of a ping interval that is decreased by 6 minutes (−8+2 minutes) from the current ping interval of the failed ping test.

Therefore, exemplary embodiments of the present invention may increase a ping interval value by 2 as opposed to 8 from a ping interval value of a successful ping test that is performed before a failed ping test when a ping test fails using a ping interval value increased by 8 (for example, a ping interval value of 40), so as to minimize battery power consumption and a probability of failure of a ping test.

In step S209, the controller 10 may decrease the short interval count value by 1 from the short interval count value corresponding to the current ping interval value, and may update the ping interval value to a ping interval value corresponding to the decreased short interval count value.

Although when the ping test using the current ping interval value fails, when the short interval count value corresponding to the current ping interval value is determined to be different from 0 by referring to the count table, the current ping interval value may be determined to be a ping interval value that is increased based on a unit of 2 and is updated.

For example, referring to FIG. 3A, when a ping test using a current ping interval value of 38 fails, it is determined that 38 has been obtained since the short interval count is increased from 2 to 3 and a ping interval value of 36 is increased by 2 to be 38 as described in step S206.

Therefore, in step S209, the controller 10 may decrease the short interval count value by 1, and may update the ping interval value to a corresponding ping interval value. For example, updating of the ping interval value proceeding in the direction of (d) of FIG. 3A (that is, update from 38 to 36) may correspond to step S209.

Exemplary embodiments of the present invention may perform a ping test by calculating an optimized ping interval value, so as to minimize power consumption of the portable terminal and the load on the network of the server, and simultaneously, to secure the reliable connection between the portable terminal and the server.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for setting a ping interval in a portable terminal, the method comprising:
   transmitting a ping message to a server after a predefined time period corresponding to a set ping interval and determining whether a response message is received from the server, so as to determine whether a ping test succeeds;
   determining whether a short interval count value of the set ping interval is 0 by referring to a count table when the ping test is determined to be successful and resetting the ping interval; and
   determining whether the short interval count value of the set ping interval is 0 by referring to the count table when the ping test fails and resetting the ping intervals,
   wherein the count table is formed of ping interval values corresponding to top interval count values and short interval count values, and
   wherein a unit value of the ping interval values corresponding to the top interval count values is greater than a unit value of the ping interval values corresponding to the short interval count values.

2. The method of claim 1, wherein, when the ping test succeeds, the resetting of the ping interval comprises:
   determining whether the short interval count value corresponding to the set ping interval is 0 by referring to the count table when the ping test succeeds; and
   resetting the set ping interval to a ping interval value corresponding to a top interval count value that is greater by 1 than a top interval count value of the set ping interval when the short interval count value is 0.

3. The method of claim 1, wherein, when the ping test succeeds, the resetting of the ping interval comprises:
   determining whether the short interval count value corresponding to the set ping interval is 0 by referring to the count table when the ping test succeeds; and
   resetting the set ping interval to a ping interval value corresponding to a short interval count value that is greater by 1 than the short interval count value of the set ping interval when the short interval count value is different from 0.

4. The method of claim 1, wherein, when the ping test fails, the resetting of the ping interval comprises:
   determining whether the short interval count value corresponding to the set ping interval is 0 by referring to the count table when the ping test fails; and
   resetting the set ping interval to a ping interval value that corresponds to a top interval count value less by 1 than a top interval count value of the set ping interval and that corresponds to a short interval count value greater by 1 than the short interval count value of the set ping interval when the short interval count value is 0.

5. The method of claim 1, wherein, when the ping test fails, the resetting of the ping interval comprises:
   determining whether the short interval count value corresponding to the set ping interval is 0 by referring to the count table when the ping test fails; and
   resetting the set ping interval to a ping interval value corresponding to a short interval count value less by 1 than the short interval count value of the set ping interval when the short interval count value is different from 0.

6. The method of claim 1, wherein the count table comprises:
   the top interval count having a unit value of 8 so that a corresponding ping interval value increases or decreases by a unit of 8 when the top interval count increases or decreases by 1; and
   the short interval count having a unit value of 2 so that a corresponding ping interval value increases or decreases by a unit of 2 when the short interval count increases or decreases by 1.

7. The method of claim 6, wherein the unit value of the short interval count is limited within a value obtained by dividing the unit value of the top interval count by the unit value of the short interval count and subtracting 1.

8. An apparatus for setting a ping interval in a portable terminal, the apparatus comprising:
   a memory configured to store a count table formed of ping interval values corresponding to top interval count values and short interval count values;
   a wireless transceiving unit configured to provide a communication function with a server; and
   a controller configured to transmit a ping message to a server after a predefined time period corresponding to a set ping interval and to determine whether a response message is received from the server, so as to determine whether a ping test succeeds, to determine whether a short interval count value of the set ping interval is 0 by referring to a count table when the ping test succeeds and to reset of the ping interval, and to determine whether the short interval count value of the set ping interval is 0 by referring to the count table when the ping test fails and to reset of the ping interval,
   wherein a unit value of the ping interval values corresponding to the top interval count values is greater than a unit value of the ping interval values corresponding to the short interval count values.

9. The apparatus of claim 8, wherein the controller determines whether the short interval count value corresponding to the set ping interval is 0 by referring to the count table when the ping test succeeds, and resets the set ping interval to a ping interval value corresponding to a top interval count value that is greater by 1 than a top interval count value of the ping interval when the short interval count value is 0.

10. The apparatus of claim 8, wherein the controller determines whether the short interval count value corresponding to the set ping interval is 0 by referring to the count table when the ping test succeeds, and resets the set ping interval to a ping interval value corresponding to a short interval count value that is greater by 1 than the short interval count value of the set ping interval when the short interval count value is different from 0.

11. The apparatus of claim 8, wherein the controller determines whether the short interval count value corresponding to the set ping interval is 0 by referring to the count table when the ping test fails, and resets the set ping interval to a ping interval value that corresponds to a top interval count value less by 1 than a top interval count value of the set ping interval and that corresponds to a short interval count value greater by 1 than the short interval count value of the set ping interval when the short interval count value is 0.

12. The apparatus of claim 8, wherein the controller determines whether the short interval count value corresponding to the set ping interval is 0 by referring to the count table when the ping test fails, and resets the set ping interval to a ping interval value corresponding to a short interval count value less by 1 than the short interval count value of the set ping interval when the short interval count value is different from 0.

13. The apparatus of claim 8, wherein the count table comprises:
   the top interval count having a unit value of 8 so that a corresponding ping interval value increases or decreases by a unit of 8 when the top interval count increases or decreases by 1; and
   the short interval count having a unit value of 2 so that a corresponding ping interval value increases or decreases by a unit of 2 when the short interval count increases or decreases by 1.

14. The apparatus of claim 13, wherein the unit value of the short interval count is limited within a value obtained by dividing the unit value of the top interval count by the unit value of the short interval count and subtracting 1.1

\* \* \* \* \*